Feb. 3, 1970 W. KRÖNIG ET AL 3,493,609
PRODUCTION OF ACETIC ACID WITH PARTIAL RECYCLING
Filed May 9, 1967
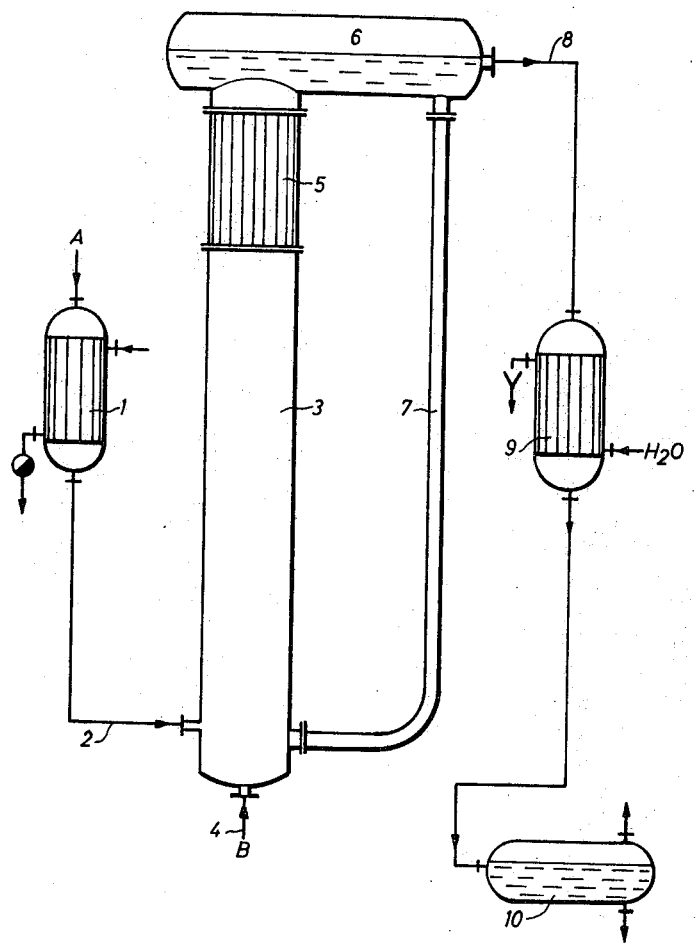
INVENTORS:
WALTER KRÖNIG, WULF SCHWERDTEL, BODO WEICHT.

United States Patent Office 3,493,609
Patented Feb. 3, 1970

3,493,609
PRODUCTION OF ACETIC ACID WITH PARTIAL RECYCLING
Walter Krönig, Wulf Schwerdtel, and Bodo Weicht, Leverkusen, Germany, assignors to Farbenfabriken Bayer Aktiengesellschaft, Leverkusen, Germany, a corporation of Germany
Filed May 9, 1967, Ser. No. 637,128
Claims priority, application Germany, May 10, 1966, F 49,157
Int. Cl. C07c 51/24, 51/42
U.S. Cl. 260—541　　　　　　　　　　　　　7 Claims

ABSTRACT OF THE DISCLOSURE

Production of acetic acid by oxidizing secondary butyl acetate with oxygen, either partially or completely in liquid phase, e.g. at 150–250° C. and 30–150 atm., in which the heat of reaction is absorbed in the reaction mixture and the reaction mixture, then cooled, preferably as an ascending stream to remove such heat of reaction, e.g. in a waste heat boiler having vertically extending externally cooled tubes, then separated into gaseous and liquid phases, and a part of the cooled liquid phase recycled to the oxidation step, to avoid corrosion of the cooling apparatus previously experienced when the cooling is carried out only of the liquid phase, i.e. after separation of the reaction mixture into such phases.

---

The present invention relates to and has for its objects the provision for a process for the production of acetic acid from butyl acetate, which may be produced optionally from n-butenes, using cooling and recycling procedures in the acetic acid production which avoid previously encountered difficulties, with other and further objects of the invention becoming apparent from a study of the within specification and accompanying examples and drawing.

In copending U.S. patent application Ser. No. 549,735, filed May 12, 1966, which is a continuation-in-part of copending U.S. application Ser. No. 332,413, filed Dec. 23, 1963, now abandoned, a process is described for the production of acetic acid in high yields, in which secondary butyl acetate is converted into acetic acid by oxidation with oxygen either completely or partly in the liquid phase. The heat of reaction developed during oxidation of the butyl acetate is absorbed in the reaction product, some of which is recycled via a cooling unit to the oxidation reactor. Waste-heat boilers in particular have proved to be effective cooling systems, particularly favourable results having been obtained with waste-heat boilers of the kind in which the recycle product to be cooled flows through a plurality of tubes surrounded externally by a cooling liquid, advantageously boiling water.

In the latter process, the oxidation reaction is carried out in a vertical or horizontal pressure vessel which is largely free of fittings, cooling units in particular, i.e. it is an almost empty vessel. A mixture consisting essentially of secondary butyl acetate, acetic acid and recycled intermediate oxidation products from the production of acetic acid is introduced as reactant at the lower end of the reaction vessel. Oxygen, advantageously in the form of compressed air or even other oxygen-containing gas mixtures, is introduced into the oxidation vessel as a coreactant. The reaction vessel is filled with liquid through which the finely divided reaction gas ascends. The reaction products and the residual reaction gas leave the reactor at its upper end.

The reactants issuing from the upper end of the reactor (reaction product and residual reaction gas) are transferred to a separator in which a constant level is maintained by means of an overflow. The liquid reaction product is run off from the lower end of the separator and is guided downwards through a waste-heat boiler in which the product gives off the quantity of heat that it had absorbed in the reactor from the heat of oxidation. This particular arrangement is of considerable advantage for reasons of design insofar as the waste-heat boiler is heavy so that it is of advantage to arrange it at a low level. The product issuing from the waste-heat boiler at its lower end is fed back into the reactor at the lower end thereof. The quantity of reaction product circulating between the reactor and the waste-heat boiler is preferably 50 to 150 times larger than the quantity introduced into the reactor as a liquid starting material.

In decomposing butyl acetate by oxidation in this way, it has been found that, after several weeks operation, corrosion affects both the waste-heat boiler through which the recycle product flows downwards, and the connecting pipes between the reactor and the waste-heat boiler, and naturally considerably reduces their service life.

It was now been found that the corrosion affecting the waste-heat boiler can be avoided, even if the boiler is made of stainless steel, if in the process for the production of acetic acid by the oxidation of sec. butyl acetate with oxygen, either completely or partly in the liquid phase, in which the heat of reaction developed during oxidation of the butyl acetate is absorbed in the reaction product and some of the reaction product is recycled through a cooling unit to the oxidation reactor, the cooling unit is arranged in the ascending stream of reactants between the reactor and a separator arranged above it in which the liquid and gaseous reaction products are separated from one another. In one particularly preferred embodiment of the process according to the invention, oxidation of the butyl acetate is initially carried out in an empty pressure vessel. The product is then directly introduced in an ascending stream into the cooling unit which is advantageously in the form of a waste-heat boiler. In other words, all the reaction product flows through the waste-heat boiler in an ascending stream and, above the waste-heat boiler, enters into a separator in which the liquid and gaseous products are separated from one another. Some of the liquid component is recycled through a down pipe into the lower half of the reactor, thus closing the circuit.

The reaction product can be made to circulate by a suitable mechanical means, for example impeller pumps or rotary pumps which are arranged in the circuit. It has been found, however, that in cases where a tower-like reactor, partially suitable for this purpose, is employed, the difference in density between the gas-containing contents of the reactor and the gas-free circulating liquid is sufficient to obtain the desired circulation. The arrangement of the waste-heat boiler above the reaction tower in accordance with the invention makes it much easier for the reaction product to circulate and, to dissipate the same quantity of heat, the waste-heat boiler can be kept considerably smaller than if it were arranged in a descending stream. The advantage of arranging the waste-heat boiler at the end of the reaction zone instead of within the reaction zone which is also possible, is that any differences there may be in the quantitative ratio between the gaseous and liquid reactants as they pass through the waste-heat boiler no longer have an influence on the largely finished course of the reaction.

It was found that, with an arrangement of this kind, the tubes of the waste-heat boiler remain unaffected by corrosion, even after several months operation. However, it is of great importance, particularly in the case of the waste-heat boiler with its large material requirement, safely to eliminate the danger of corrosion.

Although the oxidation reaction is preferably carried out in the absence of catalysts, conventional oxidation catalysts such as cobalt acetate, manganese acetate, chromium acetate, and so on may be used. The molar ratio of sec. butyl acetate to acetic acid in the starting product may be between 1:0 and 1:10. Oxidation itself is carried out at temperatures of from about 150° C. to 250° C., and preferably at temperatures of from 160° C. to 200° C., and at pressures of from 30 to 150 atms., preferably at pressures of from 40 to 100 atms. It is of advantage to employ some form of gas circulation e.g. nitrogen, carbon monoxide, carbon dioxide, and to add oxygen to the circulating inert gas, oxygen contents of between 10% and 50% by volume being used in the starting gas. The proportions of liquid starting material and inflowing oxygen are advantageously such that, at the end of the reaction zone, the concentration of oxygen in the gas is between 0.5 to 5% by volume. Approximately 20% to 70% and, with advantage, 30% to 50% of the entering sec. butyl acetate can be reacted in one passage through the reactor.

The reaction products leaving the reactor are cooled to lower temperature, e.g. 150–195° C. and separated in a separator, in which a constant level is maintained, into gas on the one hand and liquid reaction products on the other hand, a portion of such liquid products being recycled to the oxidation reactor and the remainder of such liquid products and such gas being cooled to about room temperature and again separated into gas and liquid product phases. The gas may be decompressed or, preferably, returned to the reactor, optionally after some more oxygen has been added to it. The liquid reaction products not recycled are relieved of pressure, liberating the gaseous reaction products (carbon dioxide and carbon monoxide) dissolved therein. Low-boiling intermediate oxidation products and unreacted sec. butyl acetate are distilled off from the reaction product, advantageously in the presence of steam which, following condensation, is returned to the distillation stage, and are advantageously returned to the reactor. Of the acetic acid left as a distillation residue, the quantity required to produce sec. butyl acetate may be directly re-used. If necessary, any water left over may be separated from the acetic acid by distillation before it is reacted to give sec. butyl acetate. If it is not intended to use the acetic acid to produce sec. butyl acetate, it is converted into commercial form by distillation, refining and so on.

In other respects, the butyl acetate and if desired the acetic acid may be prepared on the lines described for example in said U.S. patent application Ser. No. 549,735, filed May 12, 1966.

In a preferred embodiment of the process according to the invention, sec. butyl acetate, which is conventionally obtained by reacting n-butenes with acetic acid in the presence of an acid catalyst, and from which any unreacted hydrocarbons and the catalyst have been removed, is used for the process. The $C_4$-starting material for the production of sec. butyl acetate is intended to consist of n-butenes, optionally in admixture with butanes or even other weakly reactive hydrocarbons. The i-butene content should be as low as possible, and is preferably less than 1% or even lower. Higher unsaturated compounds such as butadiene, acetylene and so on should not be present.

The acetic acid used for ester formation from the n-butenes is preferably a concentrated acetic acid, for example, glacial acetic acid.

Esterification of the n-butene with the acetic acid is carried out in the presence of an acid catalyst, for example in the presence of mineral acids such as sulphuric acid, hydrofluoric acid or phosphoric acid, or even in the presence of solid catalysts such as, for example, acid-activated fuller's earths or catalysts containing tungsten such as tungstic acid. It has proved to be particularly suitable to carry out esterification in the presence of catalyst ion exchangers, advantageously conventional cation exchangers which contain sulphonic acid groups and which are obtained by polymerising or copolymerising aromatic vinyl compounds, followed by sulphonation. Examples of aromatic vinyl compounds which may be used in the production of the polymers or copolymers include styrene, vinyl toluenes, vinyl naphthalenes, vinylethyl benzenes, methyl styrenes, vinylchlorobenzenes and vinyl xylenes. These polymers and copolymers may be produced by various methods, for example by polymerisation alone or in admixture with other monovinyl compounds, and by cross-linking with polyvinyl compounds such as, for example, divinyl benzenes, divinyl toluenes, divinyl phenylvinylether and others. Tne polymers may be produced in the presence or in the absence of solvents or dispersants, and in the presence of various polymerisation initiators such as, for example, inorganic or organic peroxides, persulphates and others.

The sulphonic acid group may be introduced into these aromatic vinyl polymers by the various methods normally used for this purpose, for example, by sulphonating the polymers with concentrated sulphuric acid or chlorosulphonic acid or, in some cases, even by copolymerising copolymerisable aromatic compounds containing sulphonic acid groups (cf., for example, U.S. patent specification No. 2,366,007). In addition, further sulphonic acid groups may be introduced into these polymers already containing sulphonic acid groups by treating them with oleum, i.e. sulphuric acid containing sulphur trioxide, preferably at temperatures of from 0° C. to 150° C. The sulphuric acid preferably contains so much sulphur trioxide that, on completion of sulphonation, the sulphonated acid still contains between 10% and 50% of free sulphur trioxide. The resulting products preferably contain an average of 1.3 to 1.8 sulphonic acid groups per aromatic nucleus. Copolymers containing sulphonic acid groups and aromatic monovinyl compounds with aromatic polyvinyl compounds, divinyl compounds in particular, in which the polyvinyl benzene component preferably amounts to between 1% and 20% by weight of tht copolymer (cf. for example, German patent specification No. 908,247) are particularly suitable for the process according to the invention. Fine-grained ion exchangers, for example those with a grain size of between $0.1\mu$ and $50\mu$, preferably between $0.5\mu$ and $30\mu$, are advantageously used.

To carry out the liquid-phase esterification reaction, the reactants, i.e., for example, the butene/butane fraction and the acetic acid, are mixed together to form a homogeneous solution. Butenes and acetic acid may be used in molecular quantities although it has proved to be of greater advantage for the purposes of this invention to use an excess of acetic acid, for example, 2 mols of acetic acid to 1 mol of butenes. The mixture of reactants is introduced into the reaction vessel in which the catalyst, for example, an acid cation exchanger, is present in suspension, for example, in a concentration of between 1% and 20% by weight, preferably between 5% and 15% by weight. The contents of the reactor are kept thoroughly intermixed by agitation, recycling or other measures. The reaction may be carried out at temperatures of, for example, between 80° C. and 120° C., and is preferably carried out at temperatures between 100° C. and 110° C. The vapour pressure settles at around 10 atms. It is also possible, however, to apply higher pressures, for example 20 atms. and higher, by introducing inert gases under pressure. In general, average residence times of from around 30 minutes to three hours, advantageously 1 to 1½ hours, are sufficient. The reaction may be carried out in batches, although it is usually of greater advantage to work continuously and to pass the reactant through one or more reactors arranged one behind the other. On completion of the reaction, the catalyst is separated from the reaction mixture. In the case of the solid acid cation exchanger, this can be done by sedimentation, filtering or centrifuging. Separation by centrifuging under pressure is particularly effective. If there is any finely divided catalyst still present in the clarified product of centrifuging (top fraction), it can be removed by subsequent fine filtration. The residue left on completion of centrifuging (bottom fraction) is returned to the reactors.

The activity of the catalyst drops slightly over a period of time. For this reason, some of the catalyst is removed from the circuit and replaced by fresh catalyst.

The unconverted $C_4$-hydrocarbons are then preferably removed by distillation fom the catalyst-free reaction mixture.

The reaction mixture from which the $C_4$-hydrocarbons have been removed is then directly used for the production of acetic acid by oxidation. For this purpose, the molar ratio of sec. butyl acetate to acetic acid may be between 1:0 and 1:10.

The invention is illustrated by the following example.

EXAMPLE

The process according to the invention will now be described with reference to the drawing:

(a) The starting material for oxidation, which was obtained as described at (b) below, was a mixture of sec. butyl acetate, acetic acid and recycled products from the working-up by distillation of the products of oxidation. The liquid starting mixture as a whole had the following composition:

| Product: | Percent by weight |
|---|---|
| Acetic acid | 16.0 |
| Sec. butyl acetate | 55.0 |
| Intermediate oxidation products | 24.1 |
| Water | 4.9 |
| | 100.0 |

15 kg. of this starting mixture (A) were heated to 180° C. in a heater 1 and introduced through a pipe 2 into a tower reactor 3 which had a diameter of 45 mm. and a length of 4.5 m., corresponding to the reaction volume of 6.6 litres. 12 m.$^3$ of air (B) were also introduced into the reactor at its lower end through pipe 4, and several nozzles under a pressure of 60 atms. The air had been preheated to 180° C.

As the reaction mixture passed through the reactor, the butyl acetate and the intermediate oxidation products underwent conversion mainly into acetic acid and, in doing so, consumed a considerable proportion of the oxygen introduced with the air. The temperature in the lower part of the reactor rose to 190° C. and, in the upper part of the reactor, to 205° C. At the upper end of the reactor, the reactants flowed into a vertical waste-heat boiler 5 in which the temperature was lowered to 192° C. by the cooling effect of the boiling water surrounding the tubes of the boiler. The reactants issuing from the upper end of the waste-heat boiler entered the horizontal separator 6 in which the gaseous and liquid reaction products were separated from one another. 1800 kg. of liquid reaction product left the separator, flowing back down to the reactor 3 through pipe 7. The non-cycled reaction product flowed through the overflow pipe 8 together with the residual gas to the condenser 9, and from there to the separator 10 in which the residual gas and reaction product of the following composition were separated from one another at room temperature:

| Product: | Percent by weight |
|---|---|
| Acetic acid | 42.4 |
| Butyl acetate | 22.1 |
| Intermediate oxidation products | 23.1 |
| Water | 12.4 |
| | 100.0 |

The tubes of the waste-heat boiler 5 through which the reactants flowed in an ascending stream, consisted of stainless steel. They did not show any signs of corrosion after 6 months operation.

When the waste-heat boiler was arranged behind the horizontal separator 6 in the down-pipe 7 under otherwise the same conditions, corrosion in the form of pitting began to affect the tubes of the waste-heat boiler after only 6 weeks operation.

(b) The starting material for the process described at (a) above was obtained as follows:

Acetic acid and n-butenes were reacted with thorough stirring in an agitation vessel at 115° C. and 20 atms. pressure in the presence of an acid cation-exchanger which consisted of a polystyrene resin cross-linked with 8% of divinyl benzene and monosulphonated, and which acted as a catalyst in a quantity of 10% by volume in suspension in the reaction mixture. A ratio of 1.3 mols of acetic acid to 1 mol of n-butene was adjusted in the starting mixture. Following the reaction, the solid catalyst was removed by centrifuging and recycled, after which the residual $C_4$-hydrocarbons were removed by distillation. The crude product thus obtained was directly used for the oxidation reaction described at (a) above. It had the following composition:

| Product: | Percent by weight |
|---|---|
| Acetic acid | 33.6 |
| Sec. butyl acetate | 64.8 |
| Secondary products | 1.6 |
| | 100.0 |

The recycle product from working-up by distillation was used for the oxidation reaction together with this crude product. This recycle product was obtained in the form of a distillate from the azeotrope column in which the crude acetic acid is separated from any unreacted sec. butyl acetate and the intermediate products of oxidation. The composition was as follows:

| Product: | Percent by weight |
|---|---|
| Acetic acid | 1.4 |
| Sec. butyl acetate | 47.6 |
| Intermediate oxidation products | 42.0 |
| Water | 9.0 |
| | 100.0 |

Both products were mixed in accordance with their yield so that the total input into the oxidation reactor corresponded to the input analysis given in Example 1(a).

What is claimed is:

1. In the continuous process of oxidizing secondary butyl acetate with gaseous oxygen in liquid phase in an acetic acid reaction medium at elevated temperatures and elevated pressures to transform said secondary butyl acetate into acetic acid, in which the reaction mixture is recovered, separated into gaseous and liquid phases, and a recycle portion of the liquid phase cooled to remove heat of reaction absorbed during the oxidizing and recycled to the oxidizing step, the improvement which comprises recovering the reaction mixture from the oxidizing step in an ascending stream, then cooling the recovered reaction mixture in an ascending stream cooling zone path to remove heat of reaction absorbed during such oxidizing, thereafter separating the cooled reaction mixture into such gaseous and liquid phases, and recycling a portion of the cooled and separated liquid phase to the oxidizing step.

2. Improvement according to claim 1 wherein the recycled portion is 50–150 times the amount of fresh feed introduced for the oxidizing step.

3. Improvement according to claim 1 wherein said cooling zone path is a waste heat boiler zone in the form of a plurality of separate vertical heat-exchange sub-paths.

4. Improvement according to claim 1 wherein said gaseous oxygen is provided in the form of an oxygen-containing gas.

5. Improvement according to claim 1 wherein said oxidizing is carried out at a temperature substantially between about 150–250° C. and a pressure substantially between about 30–150 atmospheres to transform said secondary butyl acetate into acetic acid.

6. Improvement according to claim 5 wherein said secondary butyl acetate and acetic acid reaction medium are used in the form of a reaction mixture obtained from the conversion of n-butenes, substantially free from isobutene, with acetic acid into secondary butyl acetate at a temperature substantially between about 80–120° C. in liquid phase in the presence of an acid catalyst selected from the group consisting of mineral acid, activated fuller's earth, tungstic acid, and finely granular organic cation exchange resin containing sulfonic acid groups.

7. In the continuous process according to claim 1 of oxidizing secondary butyl acetate with a gaseous oxygen in liquid phase in an acetic acid reaction medium at a temperature substantially between about 160–200° C. and a pressure substantially between about 70–100 atmospheres to transform said secondary butyl acetate into acetate acid, recovering the resultant acetic acid reaction medium including such acetic acid reaction product, separating the gaseous phase from the liquid phase of such reaction medium including such reaction product, collecting a recycle liquid portion of such liquid phase, cooling such recycle liquid portion to remove the heat of reaction evolved during the oxidizing step and taken up by the reaction medium, and recycling such recycle liquid portion as acetic acid reaction medium for the oxidizing step, the improvement which comprises first cooling to about 15°–195° C. the recovered resultant acetic acid reaction medium including such acetic acid reaction product prior to separation thereof into such gaseous and liquid phases, and thereafter separating such cooled reaction medium including such acetic acid reaction product into said phases, collecting a recycle liquid portion of the separated liquid phase, and recycling such recycle liquid portion as acetic acid reaction medium for the oxidation step.

References Cited
UNITED STATES PATENTS

| | | | |
|---|---|---|---|
| 2,800,506 | 7/1957 | Millidge et al. | 260—533 |
| 3,362,987 | 1/1968 | Kronig et al. | 260—541 |

LORRAINE A. WEINBERGER, Primary Examiner

V. GARNER, Assistant Examiner

U.S. Cl. X.R.

260—497

PO-1050
(5/69)

UNITED STATES PATENT OFFICE
CERTIFICATE OF CORRECTION

Patent No. 3,493,609              Dated  February 3, 1970

Inventor(s) WALTER KRÖNIG, WULF SCHWERDTEL and BODO WEICHT

It is certified that error appears in the above-identified patent and that said Letters Patent are hereby corrected as shown below:

Column 8, line 4, "15°-" should be --150°- --

SIGNED AND
SEALED
JUN 30 1970

(SEAL)
Attest:

Edward M. Fletcher, Jr.
Attesting Officer

WILLIAM E. SCHUYLER, JR.
Commissioner of Patents